(12) United States Patent
Wasicek et al.

(10) Patent No.: US 12,309,172 B2
(45) Date of Patent: May 20, 2025

(54) NETWORK ATTACK PREVENTION SYSTEMS AND METHODS

(71) Applicant: Avast Software s.r.o., Prague (CZ)

(72) Inventors: Armin Wasicek, El Cerrito, CA (US); Fabrizio Biondi, Granarolo dell'Emilia (IT); Thomas Salomon, Neukirch (DE)

(73) Assignee: Avast Software s.r.o., Prague (CZ)

( * ) Notice: Subject to any disclaimer, the term of this patent is extended or adjusted under 35 U.S.C. 154(b) by 701 days.

(21) Appl. No.: 17/691,930

(22) Filed: Mar. 10, 2022

(65) Prior Publication Data

US 2023/0291751 A1    Sep. 14, 2023

(51) Int. Cl.
*H04L 9/40*     (2022.01)
*G06F 16/955*   (2019.01)
*H04L 41/16*    (2022.01)

(52) U.S. Cl.
CPC ........ *H04L 63/1408* (2013.01); *G06F 16/955* (2019.01); *H04L 41/16* (2013.01)

(58) Field of Classification Search
CPC .... H04L 63/1408; H04L 41/16; G06F 16/955
See application file for complete search history.

(56) References Cited

U.S. PATENT DOCUMENTS

| | | | | |
|---|---|---|---|---|
| 10,158,677 | B1* | 12/2018 | DiCorpo | H04L 63/145 |
| 10,601,865 | B1* | 3/2020 | Mesdaq | H04L 63/1425 |
| 2014/0033307 | A1* | 1/2014 | Schmidtler | H04L 63/1483 726/22 |
| 2019/0104154 | A1* | 4/2019 | Kumar | G06N 20/00 |
| 2020/0160207 | A1* | 5/2020 | Song | G06F 11/3466 |
| 2020/0314122 | A1* | 10/2020 | Jones | H04L 63/1483 |
| 2021/0203692 | A1* | 7/2021 | Nunes | H04L 63/1483 |
| 2021/0314352 | A1* | 10/2021 | Yadav | G06N 20/20 |
| 2022/0109649 | A1* | 4/2022 | Korotkikh | G06F 18/24133 |
| 2022/0222918 | A1* | 7/2022 | Mou | G06F 16/55 |

* cited by examiner

*Primary Examiner* — Kambiz Zand
*Assistant Examiner* — Afaq Ali
(74) *Attorney, Agent, or Firm* — Dovas Law, P.C.

(57) ABSTRACT

A system and method for preventing access to potentially malicious network destinations. The method includes determining a plurality of network destinations and indicators of the plurality of network destinations including an indicator of a first network destination. A plurality of feature vectors are generated based on the plurality of network destinations including a first feature vector based on the first network destination. Access by a user via a computing device to a second network destination is detected. A second feature vector is generated, and an indicator is determined based on the second network destination. The second feature vector is compared to the plurality of feature vectors. The access by the user to the second network destination is blocked based on the indicator of the first network destination, the indicator of the second network destination, and the comparison of the second feature vector to the plurality of feature vectors.

21 Claims, 8 Drawing Sheets

NETWORK ATTACK PREVENTION SYSTEMS AND METHODS

TECHNICAL FIELD

The disclosure relates generally to network communications, and more particularly to notifying regarding and preventing attacks performed via a computer network.

BACKGROUND

In the field of network communications, "phishing" is an attack in which an attacker tries to convince a victim to perform some dangerous action such as inserting their banking credential on an imposter ("spoofed") website, or to perform some other action guided by the attacker's desire to exploit them. For instance, an attacker may build a spoofed website that looks like a victim's bank's website. When the victim enters their credentials via the spoofed website, the credentials are stolen and sent to the attacker so that the attacker can steal money from the bank account.

Since phishing emails are sent indiscriminately to a large number of potential victims, computer security services and systems may protect their users by creating fake "honeypot" email accounts that receive and report malicious emails to a repository for storage and analysis. Such malicious emails, including potentially malicious attachments attached to the emails and website links in the emails, are added to file filters and Uniform Resource Locator ("URL") filters that are distributed to users. The file filters and URL filters enabled on the users' computing systems enable malicious content to be quickly blocked on the users' computing systems.

"Spearphishing" is a phishing attack that is crafted against a single preselected victim or group of victims, instead of being indiscriminately sent to a large number of potential victims. The attacker often takes time to study the chosen victim to identify who the victim trusts or obeys and what kind of resources the victim has access to. Then the attacker sends a message specifically targeted at the victim by leveraging social engineering techniques. Spearphishing and phishing have similar objectives including making a victim execute a malicious binary, click on a spoofed website, or use a fake, spoofed, or compromised service.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided for preventing access to a potentially malicious network destination. The method includes determining a plurality of network destinations including a first network destination, determining a plurality of indicators of the plurality of network destinations including one or more indicators of the first network destination, and generating a plurality of feature vectors based on the plurality of network destinations including a first feature vector based on the first network destination. An access by a particular user via a particular computing device to a second network destination is detected. A second feature vector is generated based on the second network destination, and one or more indicators of the second network destination is determined. The second feature vector is compared to the plurality of feature vectors including the first feature vector. The method further includes blocking the access by the particular user via the particular computing device to the second network destination based on the one or more indicators of the first network destination, the one or more indicators of the second network destination, and the comparison of the second feature vector to the plurality of feature vectors including the first feature vector.

A method of performing a notification action or blocking action with respect to access to a network destination is further provided. The method includes determining a plurality of network destinations including a first network destination and determining a plurality of indicators of the plurality of network destinations including one or more indicators of the first network destination. A plurality of feature vectors are generated based on the plurality of network destinations including a first feature vector based on the first network destination. A particular model is trained based on the plurality of feature vectors and the plurality of indicators. Network browsing of a particular user on a particular computing device is monitored. The particular model is further trained to generate an updated model based on the network browsing of the particular user on the particular computing device. An access by the particular user via the particular computing device to a second network destination is detected. A second feature vector is generated based on the second network destination. One or more indicators of the second network destination are determined. The updated model is applied to the second feature vector and the one or more indicators of the second network destination. The method further includes performing based on the application of the updated model one or both of a user notification action by the particular computing device or an action by the particular computing device blocking the access by the particular user via the particular computing device to the second network destination.

Further provided is a network threat mitigation system. The network threat mitigation system includes a first computing system including at least a first processor and at least a first non-transitory computer readable storage medium having encoded thereon first instructions that when executed by the at least the first processor cause the first computing system to perform a first process. The first process includes determining a plurality of network destinations including a first network destination, determining a plurality of indicators of the plurality of network destinations including one or more indicators of the first network destination, generating a plurality of feature vectors based on the plurality of network destinations including a first feature vector based on the first network destination, training a particular model based on the plurality of feature vectors and the plurality of indicators, and transmitting the particular model. The network threat mitigation system further includes a second computing system including at least a second processor and at least a second non-transitory computer readable storage medium having encoded thereon second instructions that when executed by the at least the second processor cause the second computing system to perform a second process. The second process includes receiving the particular model from the first computing system, monitoring network browsing of a particular user on the second computing system, further training the particular model to generate an updated model based on the network browsing of the particular user on the second computing system, detecting an access by the particular user via the second computing system to a second network destination, and generating a second feature vector based on the second network destination. The second process further includes determining one or more indicators of the second network destination, applying the updated model to the second feature vector and the one or more indicators of the second network destination, and performing based on the application of the updated model one or both of a user notification action or an action blocking the access by the particular user via the second computing system to the second network destination. The first process can further include monitoring network browsing of a plurality of users on a plurality of computing devices, and determining the plurality of network destinations including the first network destination based on the network browsing of the plurality of users.

Further provided is a computing system including one or more processors and one or more non-transitory computer readable storage media having encoded thereon instructions that when executed by the one or more processors cause the computing system to perform a process. The process includes receiving a particular model based on a plurality of feature vectors and a plurality of indicators, the plurality of feature vectors and the plurality of indicators based on a plurality of network destinations including a first network destination, monitoring network browsing of a particular user on the computing system, and further training the particular model to generate an updated model based on the network browsing of the particular user on the computing system. The process also includes detecting an access by the particular user via the computing system to a second network destination, generating a second feature vector based on the second network destination, and determining one or more indicators of the second network destination. The process further includes applying the updated model to the second feature vector and the one or more indicators of the second network destination and performing based on the application of the updated model one or both of a user notification action by the computing system or an action blocking the access by the particular user via the computing system to the second network destination.

Further provided is a non-transitory computer-readable storage medium storing executable instructions that, as a result of execution by one or more processors of a particular computing device, cause the particular computing device to perform operations. The operations include receiving a particular model based on a plurality of feature vectors and a plurality of indicators, the plurality of feature vectors and the plurality of indicators based on a plurality of network destinations including a first network destination, monitoring network browsing of a particular user on the particular computing device, and further training the particular model to generate an updated model based on the network browsing of the particular user on the particular computing device. The operations also include detecting an access by the particular user via the particular computing device to a second network destination, generating a second feature vector based on the second network destination, and determining one or more indicators of the second network destination. The operations further include applying the updated model to the second feature vector and the one or more indicators of the second network destination and performing based on the application of the updated model one or both of a user notification action by the particular computing device or an action blocking the access by the particular user via the particular computing device to the second network destination.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Since spearphishing emails are not sent to a large number of potential victims, they are not typically captured by honeypots controlled by computer security systems which enable computer security applications. Accordingly, spearphishing emails and websites (URLs, domains) linked to in spearphishing emails are not likely to be automatically filtered by such computer security applications. Also, spoofed websites may be hosted on shared public hosting sites. Hence, URLs and IPs of the spoofed websites may not be indicative of a malicious website. In general, the more specifically targeted a phishing attack, the harder it is to detect by computer security systems. Described herein are systems and processes to mitigate and prevent network attacks, which systems and processes are particularly effective against phishing and spearphishing attacks. The herein-described systems and processes enable URL and website inspection for preventing malicious webpages from being displayed or interacted with by a user.

As described herein, a "vector" is a list of numerical values.

As described herein, a "feature vector" is an n-dimensional vector (i.e., a vector of any dimensions) of numerical features that represent some object (e.g., a digital image).

As described herein, reference to "first," "second," and "third," components (e.g., a "first network destination," a "second network destination") or "particular" or "certain" components or implementations (e.g., a "particular user," a "certain user," a "particular model," a "particular computing device", a "particular implementation") is not used to show a serial or numerical limitation or a limitation of quality but instead is used to distinguish or identify the various components and implementations.

As described herein, an "indicator" of a network destination is identifying information of the network destination available at the network destination (e.g., webpage URL, certificate, metadata).

Figure 1:
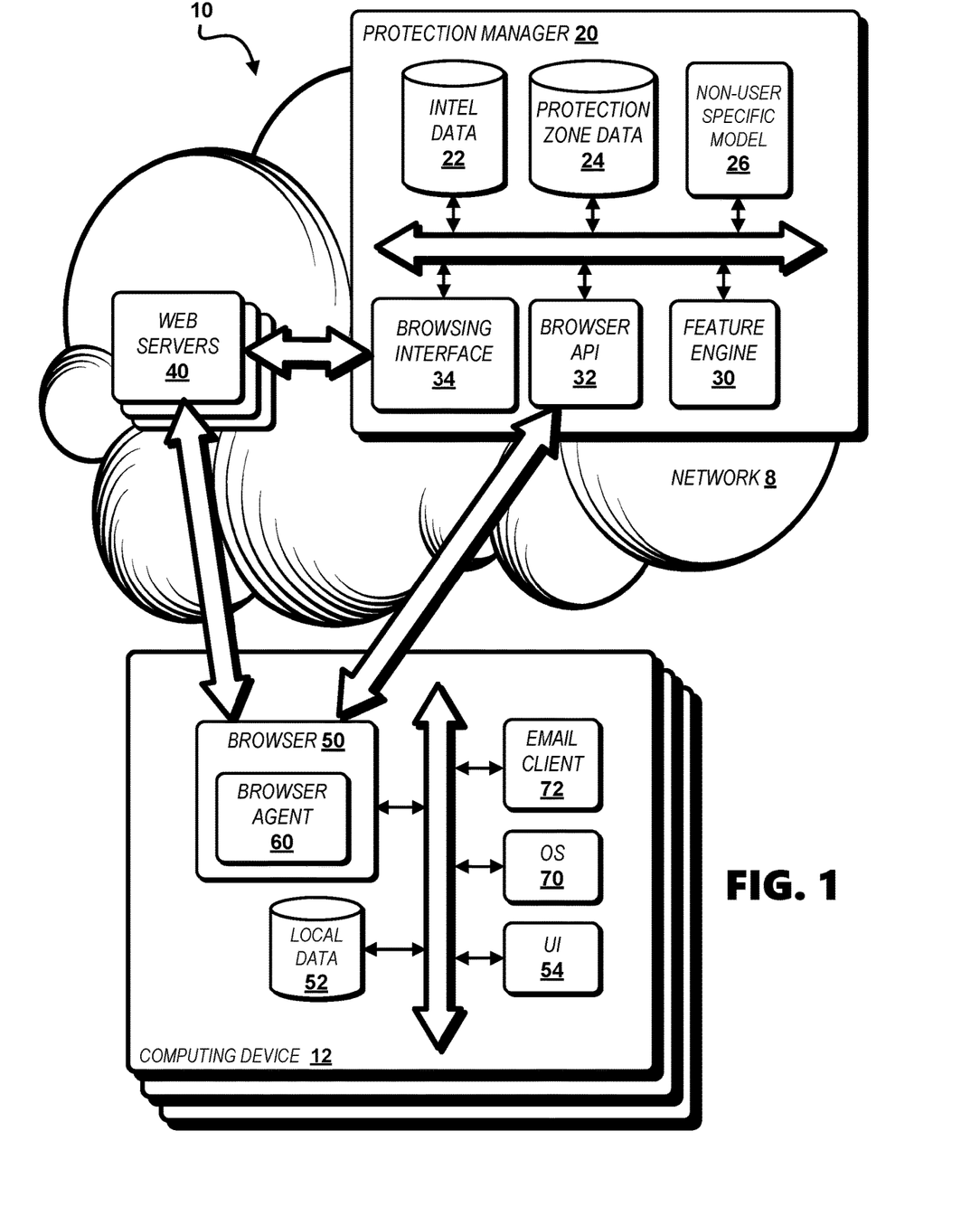
FIG. 1 shows an environment enabled by a computer network in which a network-connectable processor-enabled protection manager provides threat detection data to computing devices.

Referring to FIG. 1, an environment 10 enabled by a computer network 8 is illustrated in which a network-connectable processor-enabled protection manager 20 scans networks for the purpose of providing data for detecting threats to computing devices 12. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A browser agent 60, for example a browser extension or a browser integration, enables monitoring of network browsing activities performed on a browser application ("browser") 50 on a computing device 12 by a user. The browser agent 60 further enables aggregating the browsing history and clickstream of the user on the computing device 12, and storing of aggregated information in a local datastore 52. Monitoring by the browser 50 via the browser agent 60 provides the protection manager 20 with intelligence data including data files and ordered sequences of hyperlinks followed by a user at one or more websites or other network destinations, which data is beneficially received by the protection manager 20 and stored in de-identified form in an intelligence datastore 22.

Web servers 40 operated by various entities can enable online services including network-based applications, webpages, or other online services accessible via the browser 50. A user is enabled to engage an online service enabled by a web server 40 for example by registering a user account for which account credentials (e.g., username, password) are created by the user or by an administrator of the service. The protection manager 20 can gather intelligence data in the form of data files, content, and screen captures from web servers 40 via a browsing interface 34 which data is stored in the intelligence datastore 22.

The protection manager 20 coupled to a computing device 12 enables online threat detection and mitigation to be provided to the computing device 12 via the browser agent 60. The browser agent 60 monitors via the browser 50 user activity on network-based applications and websites enabled by the web servers 40. Monitored data is stored in the local datastore 52 and fed to the protection manager 20 via a browser application program interface ("API") 32 and stored in the intelligence datastore 22, beneficially in de-identified form, which data is used in threat detection and mitigation. The browser API 32 communicates with the browser agent 60 via the computer network 8. Alternatively, the protection manager 20 can be provided as an application on the computing device 12, for example as an integration or extension to the browser 50, and the browser agent 60 can communicate locally with the protection manager 20 via the browser API 32 on the computing device 12.

The browser agent 60 can be provided integral with or as an extension or plugin to one or more browsers 50 and provides notices to a user via a user interface 54. The browser agent 60 gathers user actions including logins, browsing history, and clickstreams from a browser 50 with which it is integrated or in communication with, which data is transmitted to the protection manager 20 via the browser API 32 and stored in the intelligence datastore 22. The protection manager 20 provides threat information to the browser agent 60 via the browser API 32 for enabling the browser agent 60 to provide notifications to a user and to filter and block network-based threats confronted by a browser 50, which threat information can be stored in the local datastore 52. An operating system 70 (hereinafter "OS 70") is executed on the computing device 12 which enables integration of the browser agent 60 and the browser 50. The browser agent 60 is beneficially provided on a plurality of computing devices 12 of a plurality of users allowing aggregation by the protection manager 20 of de-identified data from the plurality of computing devices 12.

Figure 2:
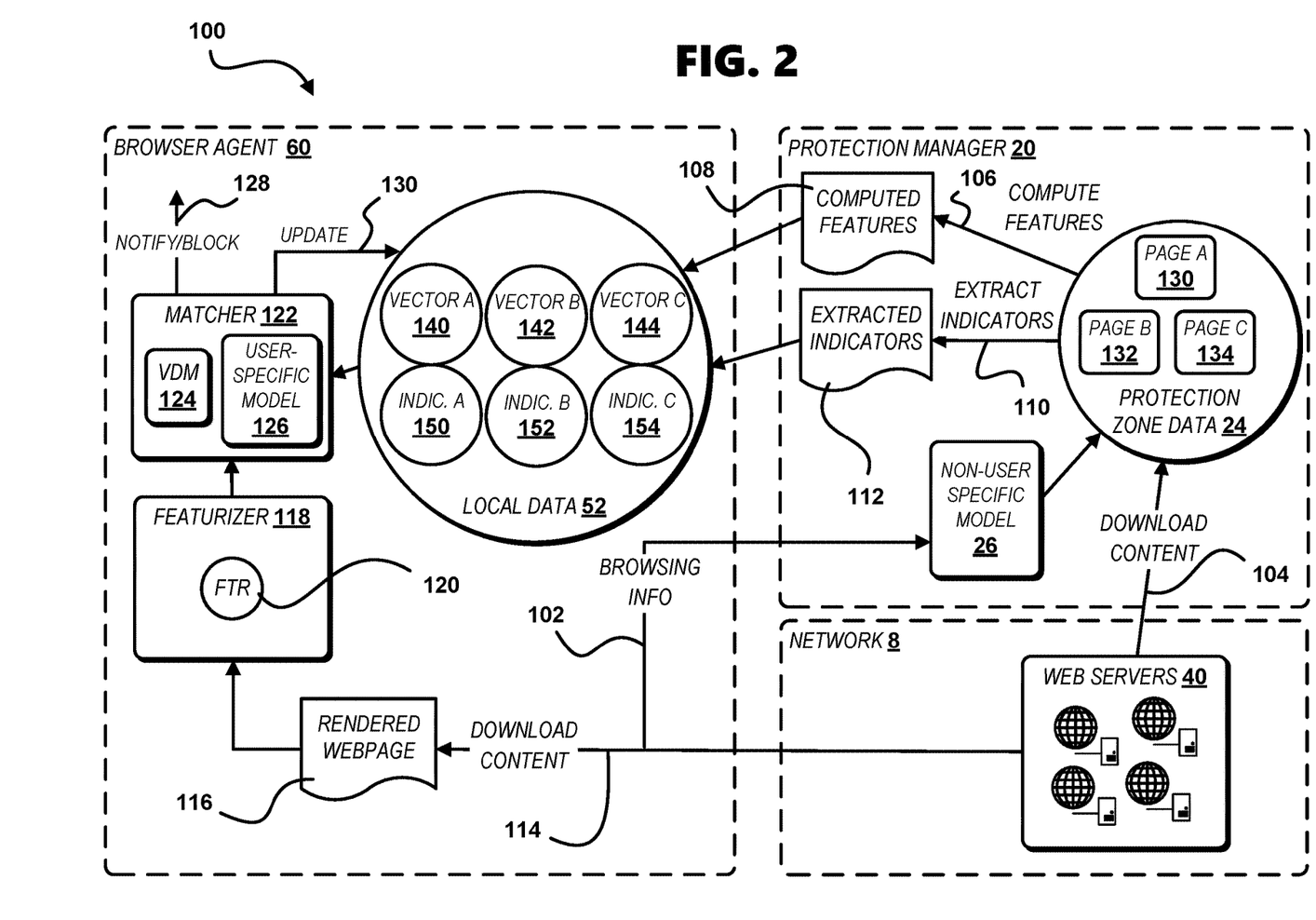
FIG. 2 shows a process flow enabling suspicious webpage detection and blocking in the environment of FIG. 1.

Referring to FIGS. 1 and 2, a process flow 100 enabled in the environment 10 is shown. The browser agent 60 enables suspicious webpage detection capabilities on a computing device 12 operated by a user, for example to protect the user from phishing and spearphishing attacks. The browser 50 via the browser agent 60 monitors browser use and collects user browser history to form a profile that includes the websites relevant for protection, the profile termed herein as a "protection zone". The protection manager 20 receives from one or more browser agents 60 user browsing information of one or more users (step 102) forming a non-user-specific model 26 to establish a protection zone in the protection zone datastore 24 including URLs, domains of websites, certificates of websites, and other indicators of network destinations visited via a browser 50. The network destinations of a protection zone can include for example a webpage A 130, a webpage B 132, and a webpage C 134. The protection zone can be generated by the protection manager 20 based on collected data from one or more computing devices 12 operating a browser 50 and a browser agent 60.

The protection zone can additionally or alternatively be maintained in the local datastore 52 on the computing device 12 or at a network location accessible only to a user of the computing device 12. The protection zone maintained by the protection manager 20 in the protection zone datastore 24 can include a grouping of non-user-specific webpages. A personalized protection zone including personalized, user-specific, webpages associated with a particular user via cookies or other website tracking mechanisms can be maintained by the browser agent 60. The personalized protection zone is beneficially maintained in the local datastore 52 of a computing device 12 or a secure network location accessible to a user of the computing device 12 to maintain user privacy. Maintaining a personalized protection zone in the local datastore 52 or secure network location enables protection of a user's personal use data and browsing history.

In a step 104, the protection manager 20 accesses and downloads content (e.g., via the browsing interface 34) including webpages from websites at network destinations indicated by the protection zone, the protection zone having been established based on the browsing history of one or more users. The protection manager 20 beneficially accesses the webpages independently of any browser 50 on a computing device 12, and a browser 50 need not have online access at the time the protection manager 20 accesses the webpages. In a step 106, the protection manager 20 implements a feature engine 30 to compute features 108 of the webpages and generate a feature vector of each webpage included in the protection zone by downloading and rendering each webpage. The feature vector is based on, but not restricted to, a screen capture or window capture of the webpage and provides a numerical representation of displayed pixels in the screen or window. Other raw data that can be incorporated into the feature vector are domain names, certificates, or any other type of information that is suitable to uniquely identify a webpage. In a step 110, the protection manager 20 via the browsing interface 34 extracts indicators 112 including for example URLs, domains of websites, certificates of websites, and other indicators of network destinations visited via the browser 50.

Specific parameters of a particular user including for example credentials, internet protocol geolocation ("geoip"), and cookies can be implemented by the protection manager 20 via the browsing interface 34 when the protection manager 20 loads a webpage. Alternatively, or concurrently, the browser agent 60 of a particular user can compute features of the webpages and generate a feature vector of one or more select webpages by downloading and rendering the webpages of websites of a protection zone established based on the browsing history of the particular user, for example based on websites frequently visited by the particular user.

The computed features 108 in the form of computed feature vectors associated with webpages included in the protection zone are transmitted by the protection manager 20 via the browser API 32 to users' browsers 50 via the browser agent 60. In an alternative embodiment, the computed feature vectors can be transmitted by the protection manager 20 to an online cloud instance embodying a headless browser incorporating the browser agent 60. The browser agent 60 (e.g., a software module in the form of an extension or integration) receives and stores the feature vectors for the protection zone in a local datastore 52. Different users on different computing devices 12, or on the same computing device 12 operating the same browser 50, can be associated with different sets of computed features 108 (e.g., feature vectors) corresponding to different protection zones or different webpage versions (e.g., based on different credentials, internet protocol geolocation ("geoip"), and cookies).

During operation by a user of the computing device 12, content can be downloaded from a web server 40 (step 114) from which a webpage 116 can be rendered and loaded into the browser 50. For example, an email message can be received via an email client 72 and the user of the computing device 12 can click on a weblink directed to the webpage 116 in the email message, or the user can follow a link to the webpage 116 during browsing activities within the browser 50. Alternatively, in the case of a headless browser incorporating the browser agent 60, loading of received links can be scheduled at regular intervals.

When a browser 50 renders a webpage, the browser agent 60 computes, by a featurizer 118, features 120 of the rendered webpage to generate a feature vector of the rendered webpage 116. The feature vector of the rendered webpage 116 is compared by a matcher 122 to the feature vectors of an active protection zone stored in the local datastore 52, for example including a feature vector A 140, a feature vector B 142, and a feature vector C 144 respectively associated with the webpage A 130, the webpage B 132, and the webpage C 134. A match on the feature vectors signifies a match on visual appearances of the associated webpages.

A match determined based on the feature vectors triggers further evaluation against other indicators regarding the integrity of the webpage 116, for example a universal resource locator ("URL"), domains, certificates, and metadata. The matcher 122 includes a visual detection module 124 for performing evaluations against other indicators (e.g., an indicator A 150, indicator B 152, or indicator C 154). The visual detection module 124 applies a machine learning model trained to detect phishing and spearphishing webpages or other malicious webpages. If any of the indicators of the rendered webpage 116 fails to match indicators of webpages in the protection zone, a phishing attempt is likely and a notification can be issued, a blocking action can be performed, or a notification action and a blocking action can be performed (step 128). For example, if the rendered webpage 116 is determined to have the same visual appearance based on a feature vector comparison as a webpage in the protection zone (e.g., "bankofamerica.com") but is determined have a different URL (e.g., "bankyamerica.com"), the visual detection module 124 can flag the rendered webpage 116 as potentially malicious. If one or more indicators (e.g., URL or certificate) of the rendered webpage 116 match indicators of webpages in the protection zone, an update process (step 130) can be performed in which a feature vector (e.g., feature vector A 140, feature vector B 142, or feature vector C 144) is updated in the protection zone or a feature vector is generated and added to the protection zone to reflect the rendered webpage 116. An update is stored in the local datastore 52 and can for example reflect webpage customizations (e.g., based on cookies, user logins) particular to the user of the browser 50.

The browser agent 60 provides suspicious webpage detection capability to a computing device 12 operated by a user and allows a user's personal data (e.g., personal web browsing history) to be used to establish a protection zone specifying legitimate webpages for protecting the user from phishing attacks, spearphishing attacks, and other malicious network activities. A benefit of executing the browser agent 60 on the computing device 12 of a user is that all webpages rendered by the user's browser 50 can be analyzed via the browser agent 60. Further, since the user's browser 50 does the rendering (e.g., as opposed to a headless browser on a remote network accessible system), customizations like cookies, logins, and similar information can be manifested in the rendered webpage 116 allowing for personalized updates to the protection zone.

Figure 3:
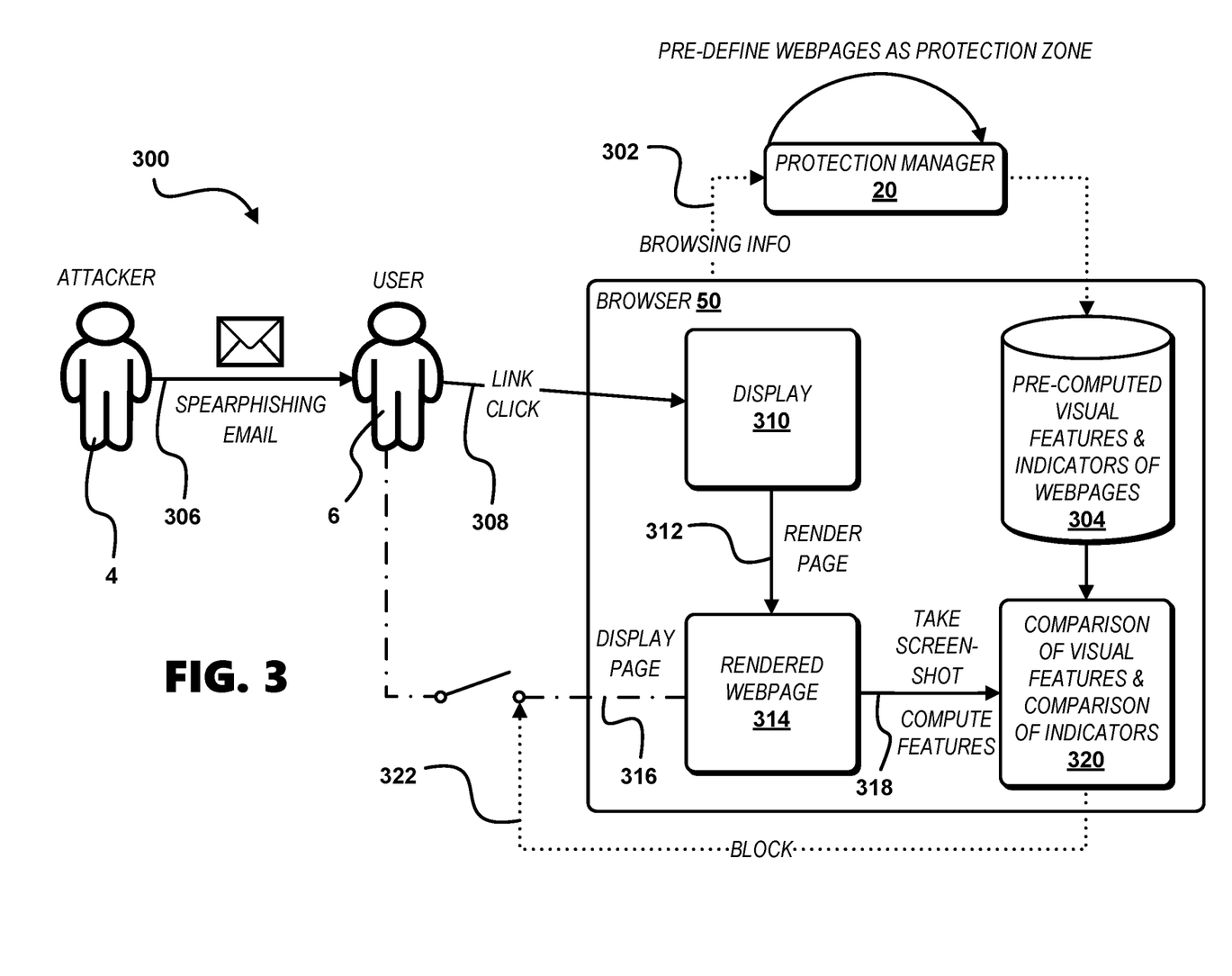
FIG. 3 shows an exemplary implementation of the process flow of FIG. 2 in which a block signal can be generated to disable a displayed webpage on a computing device.

Referring to FIG. 3, an exemplary implementation 300 of the process flow 100 enabled in the environment 10 is shown. The protection manager 20 predefines a protection zone including webpages based on browsing information 302 from one or more computing devices 12 executing a browser agent 60 and a browser 50. The protection manager 20 generates and transmits pre-computed visual features (e.g., feature vectors) and indicators (e.g., URLs, certificates) 304 which are beneficially stored in a local datastore 52 of a computing device 12 on which a browser 50 and a browser agent 60 are enabled. An attacker 4, transmits (step 306) a spearphishing email to a certain user 6 of the computing device 12, the spearphishing email including a link to a malicious webpage on the internet. The certain user 6 clicks the link (step 308) in the spearphishing email activating a display 310 on the browser 50 of the computing device 12. The browser 50 follows the link over the internet and performs a rendering (step 312) to generate a rendered webpage 314. The rendered webpage 314 is displayed to a user (step 316) by the browser 50 via the user interface 54. In a step 318, the browser agent 60 takes a screenshot of the rendered webpage 314 and computes visual features (e.g., feature vectors) of the rendered webpage 314. In a step 320, the visual features and indicators of the rendered webpage 314 are compared to the pre-computed visual features and indicators 304 by the browser agent 60 via the matcher 122. If it is determined by the comparison of step 320 that the rendered webpage 314 is likely to be spoofing a legitimate webpage, a block signal is generated by the browser agent 60 via the matcher 122 to disable the user's displayed webpage (step 322). A notification can be provided to the user prior to or subsequent to instituting the block.

Figure 4:
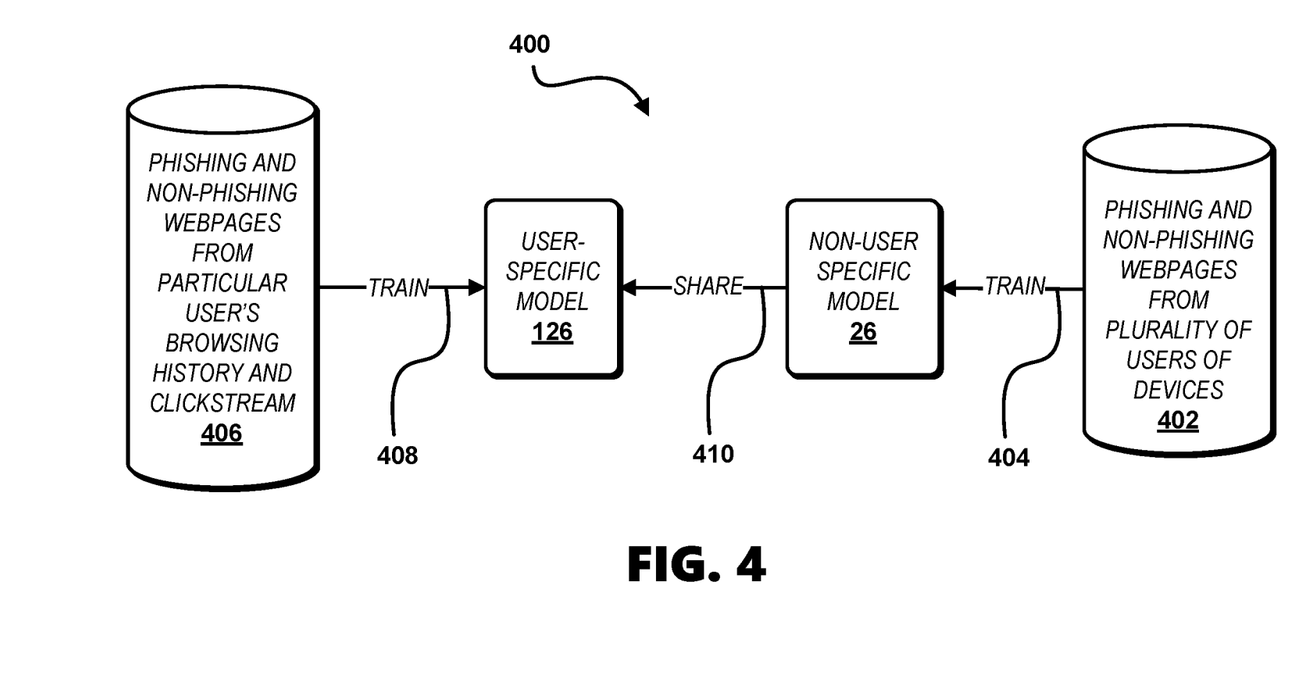
FIG. 4 shows a training process for training models for detecting threats to computing devices.

The matcher 122 can learn the websites visited by a user and can be trained to connect such websites' visual appearance (e.g., via feature vectors of webpages) to website indicators (e.g., URLs, certificates, and metadata). Referring to FIGS. 2 and 4, in a training process 400, the non-user-specific model 26, beneficially including a neural network (e.g., a convolutional neural network ["CNN"]), is trained (step 404) by a datastore 402 of phishing (and spearphishing and other malicious activity) and non-phishing (and other non-malicious activity) webpages from a plurality of users of a plurality of computing devices 12. A user-specific model 126, beneficially including a neural network (e.g., a CNN), is trained (step 408) by a datastore 406 of phishing (and spearphishing and other malicious activity) and non-phishing (and other non-malicious activity) webpages from the browsing history and clickstream of a particular user of a browser 50. The non-user-specific model 26 is shared (step 410) to be used as a base model by the browser agent 60 in training the user-specific model 126 for the particular user, for example via transfer learning. The user-specific model 126 residing on the particular user's computing device 12 learns to recognize specific websites visited by the particular user, such as the website of their bank, and is configured to raise warnings and block websites for example when a malicious entity tries to spoof login pages of websites accessed by the particular user. In a particular embodiment, in training or applying the user-specific model 126 or non-user-specific model 26, outputs from a CNN of the model can be used as inputs to a clustering algorithm (e.g., nearest neighbor). For example, nearest neighbor clustering can be used to determine a matching webpage.

As described herein, the browser agent 60 can be implemented as a browser extension which can access a user's visited webpages and the visual appearance of visited webpages, such as by calling the "chrome.tab.captureVisualTab" command in Chromium™-based browsers such as Avast™ Secure Browser™. A neural network is deployed on the user's computing device 12, for example as part of the browser extension or separately (e.g., another application), and trained on data collected from the user's browsing habits. A pre-trained non-user-specific model 26 generated by the protection manager 20 can be used as a baseline for transfer learning to be applied to a user-specific model 126, beneficially including the neural network deployed on the user's computing device 12. The non-user-specific model 26 is beneficially pre-trained to distinguish a large amount of spoofed web pages and hence provides detection functionalities even without customization based on browsing activities of a particular user. The non-user-specific model 26 and the user-specific model 126 are beneficially unsupervised or semi-supervised machine learning models. Alternatively, or in addition to the non-user-specific model 26 and the user-specific model 126, a federated learning model can be generated based on data from a plurality of users of one or more browsing agents 60 on one or more computing devices 12. In generating a federated learning model, one or more browser agents 60 share visual characteristics (e.g., feature vectors) of newly detected malicious webpages (e.g., phishing, spearphishing websites) on which the federated learning model is based while keeping private which webpages the users of the one or more browsing agents 60 were actually visiting.

The visual detection module 124 learns typically visited webpages (e.g., banking, social media webpages) and can instruct the browser agent 60 (e.g., a browser extension or add-on) to load pre-trained data from a network-located system. The network-located system can include the protection manager 20, which can include a personal cloud system with non-user-specific pre-trained data or user-specific data pertaining directly to the particular user of the browser 50 or computing device 12. Accessing pre-trained data allows local training time on the computing device 12 to be shortened and the memory and storage consumption on the computing device 12 to be less.

A particular user's web browsing history can be used to collect data on websites they commonly visit, for example during a training period in which a neural network deployed by the browser agent 60 only observes the user's web browsing without raising any alert or blocking any webpage. This collecting produces additional user-specific training data that is used to retrain and fine-tune the visual detection module 124 and the user-specific model 126. The effectiveness of the visual detection module 124 is improved for the particular user while preserving the user's privacy, since the user's browsing habits are not shared with a network-located system for example a network-located system managed by a security service provider.

Given the sensitivity of machine learning algorithms such as neural networks on training data, by training the visual detection module 124 and user-specific model 126 specifically on a user's browsing data (e.g., rendered webpages, URLs, and certificates) a detection rate will be higher and a false positive rate will be lower for the visual detection module 124 than if a generally-trained (non-user-specific) neural network is used. After user-specific training data (e.g., rendered webpages, URLs, and certificates) has been collected, user-specific training data can also be used to discard from the visual detection module 124, user-specific model 126, and related systems data that is not relevant to the user (e.g., non-user-specific rendered webpage feature vectors). Discarding less relevant or irrelevant data reduces the size of the dataset present on the user's computing device 12 and the time required for the browser agent 60 to make a decision on a webpage (e.g., to block or not to block), because less data is required to be stored. Hence, the performance of the browser agent 60 and other processes requiring resources on the computing device 12 are improved.

The herein described systems, including protection zones enabled via the browser agent 60 and the protection manager 20, enable personalized protection that protects users from websites impersonating other websites of interest to the user. Such impersonated websites could be part of a spearphishing attempt using personal data related to the user's preferences. Websites visited by a user via the browser 50 and monitored by the browser agent 60 are privacy-relevant information. In the absence of the browser agent 60, such privacy-relevant information could not be easily collected (e.g., on a remote or backend system) to train a phishing-detection machine learning algorithm. Training a phishing-detection machine learning algorithm including the user-specific model 126 on a user's computing device 12 via the browser agent 60 allows a user's privacy to be respected, since training data does not need to leave the user's computing device 12. Also, training the algorithm on a user's specific browsing habits improves webpage detection rate and reduces false positives compared to an algorithm trained on general data. Further, training the algorithm on a user's specific browsing habits reduces the amount of data that has to be stored on the user's computing device 12, since the algorithm can be tailored exclusively to the websites visited by the user, saving space on the user's computing device 12 and improving the performance of the computing device 12.

Figure 5:
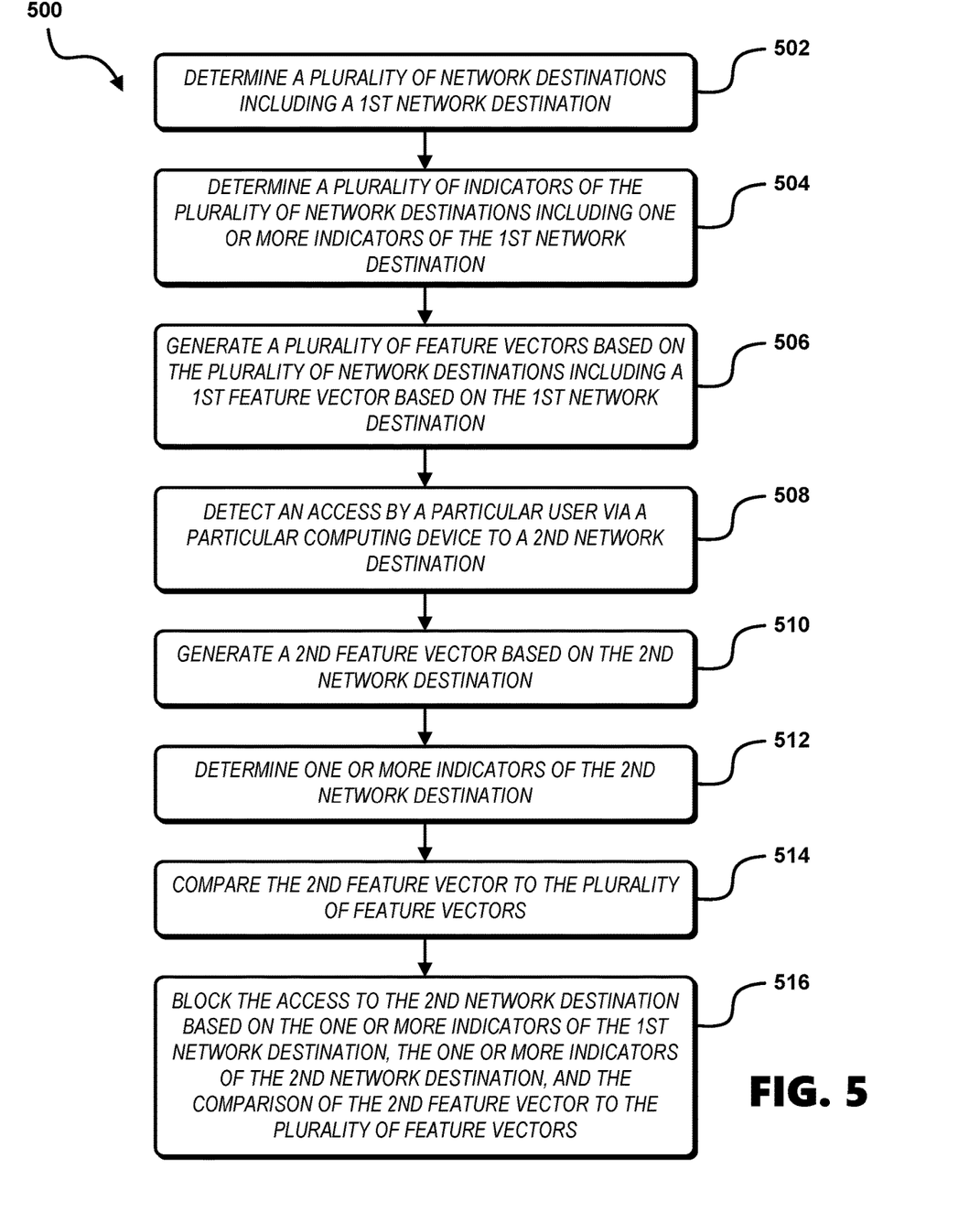
FIG. 5 is a diagram showing a method of managing access to a network destination.

Referring to FIG. 5, a method 500 of managing access to a network destination, for example a network destination on the internet, is shown. The method 500 is described with reference to the components of the environment 10, including the protection manager 20, the web servers 40, and the computing devices 12 including the browser 50 and the browser agent 60. Alternatively, the method 500 can be performed via other systems and is not restricted to being implemented by the described components.

The method 500 includes determining a plurality of network destinations including a first network destination (step 502) and determining a plurality of indicators of the plurality of network destinations including one or more indicators of the first network destination (step 504). A plurality of feature vectors are generated based on the plurality of network destinations including a first feature vector based on the first network destination (step 506). An access by a particular user via a particular computing device to a second network destination is detected (step 508). A second feature vector is generated based on the second network destination (step 510). One or more indicators of the second network destination are detected (step 512).

In a particular embodiment of the method 500, the first network destination can include a first webpage, and the second network destination can include a second webpage. The one or more indicators of the first network destination can include one or more of a Uniform Resource Locator ("URL") of the first webpage, a certificate of the first webpage, or metadata of the first webpage. The one or more indicators of the second network destination can include one or more of a URL of the second webpage, a certificate of the second webpage, or metadata of the second webpage.

In another particular embodiment of the method 500, the plurality of network destinations can include a plurality of webpages wherein the first network destination includes a first webpage. The second network destination can include a second webpage. A plurality of images of the plurality of webpages can be captured, wherein a first image of the first webpage is captured. A second image of the second webpage can be captured. The plurality of feature vectors including the first feature vector can be generated based on the plurality of images, wherein the first feature vector is based on the first image. The second feature vector can be generated based on the second image.

In another particular embodiment of the method 500, the plurality of network destinations can include a plurality of webpages, wherein the first network destination includes a first webpage. The second network destination can include a second webpage. A plurality of numbers of URLs respectively in the plurality of webpages can be determined, wherein a first number of URLs in the first webpage are determined. A second number of URLs in the second webpage can be determined. The plurality of feature vectors including the first feature vector can be generated based on the plurality of numbers of URLs, wherein the first feature vector is based on the first number of URLs. The second feature vector can be generated based on the second number of URLs.

The second feature vector is compared to the plurality of feature vectors including the first feature vector (step 514). Comparing the second feature vector to the plurality of feature vectors including the first feature vector can include determining a Euclidian distance between the second feature vector and the first feature vector. The access by the particular user via the particular computing device to the second network destination is blocked based on the one or more indicators of the first network destination, the one or more indicators of the second network destination, and the comparison of the second feature vector to the plurality of feature vectors including the first feature vector (step 516). Further, a notification can be provided to the particular user based on the one or more indicators of the first network destination, the one or more indicators of the second network destination and the comparison of the second feature vector to the plurality of feature vectors including the first feature vector.

A match between the second feature vector and the first feature vector can be determined based on the comparison of the second feature vector to the plurality of feature vectors including the first feature vector, and the access by the particular user via the particular computing device to the second network destination can be blocked in step 516 based on the one or more indicators of the first network destination, the one or more indicators of the second network destination, and the determination of the match. Alternatively, a classifier can be trained based on the first feature vector and the one or more indicators of the first network destination, the classifier can be applied to the one or more indicators of the second network destination, and the access by the particular user via the particular computing device to the second network destination can be blocked in step 516 based on the application of the classifier.

In another particular implementation of the method 500, a particular model can be trained based on the plurality of feature vectors and the plurality of indicators, and network browsing of the particular user on the particular computing device can be monitored. The particular model can be further trained to generate an updated model based on the network browsing of the particular user on the particular computing device. The updated model can be applied to the second feature vector and the one or more indicators of the second network destination, and the blocking of the access by the particular user via the particular computing device to the second network destination in step 516 can be based on the application of the updated model. In a particular implementation, the plurality of feature vectors and the plurality of indicators can be input to a convolutional neural network ("CNN") to train the particular model.

In another particular implementation of the method 500, network browsing of a plurality of users on a plurality of computing devices can be monitored, the plurality of network destinations including the first network destination can be determined based on the network browsing of the plurality of users, and a particular model can be trained based on the plurality of feature vectors and the plurality of indicators. The particular model can be transmitted to the particular computing device, and network browsing of the particular user on the particular computing device can be monitored. The particular model can be further trained to generate an updated model based on the network browsing of the particular user on the particular computing device. The updated model can be applied to the second feature vector and the one or more indicators of the second network destination, and the blocking of the access by the particular user via the particular computing device to the second network destination in step 516 can be based on the application of the updated model. Further, additional network destinations can be determined based on the network browsing of the particular user on the particular computing device, additional indicators of the additional network destinations can be determined, and additional feature vectors can be determined based on the additional network destinations, wherein the further training of the particular model to generate the updated model can be based on the additional feature vectors and the additional indicators.

The particular model beneficially includes a particular convolutional neural network ("CNN"). The plurality of feature vectors and the plurality of indicators can be input to the particular CNN to train the particular model, the additional feature vectors and the additional indicators can be input to the particular CNN to further train the particular model to generate the updated model, wherein the updated model includes an updated CNN, and the second feature vector and the one or more indicators of the second network destination can be input to the updated CNN to apply the updated model. The particular model can further include a clustering algorithm. An output resulting from the inputting of the plurality of feature vectors and the plurality of indicators to the particular CNN can be input to the clustering algorithm to train the particular model. An output resulting from the inputting of the additional feature vectors and the additional indicators to the particular CNN can be input to the clustering algorithm to further train the particular model to generate the updated model, the updated model including the clustering algorithm, and an output resulting from the inputting of the second feature vector and the one or more indicators of the second network destination to the updated CNN can be input to the clustering algorithm to apply the updated model.

Network browsing of the particular user on the particular computing device can be monitored, and determining the plurality of network destinations including the first network destination in step 502 can be based on the network browsing of the particular user. Alternatively, network browsing of a plurality of users on a plurality of computing devices can be monitored, and determining the plurality of network destinations including the first network destination can be based on the network browsing of the plurality of users. Alternatively, network browsing of a plurality of users on a plurality of computing devices can be monitored, network browsing of the particular user on the particular computing device can be monitored, and the plurality of network destinations including the first network destination can be determined based on the network browsing of the plurality of users and the network browsing of the particular user.

Figure 6A:
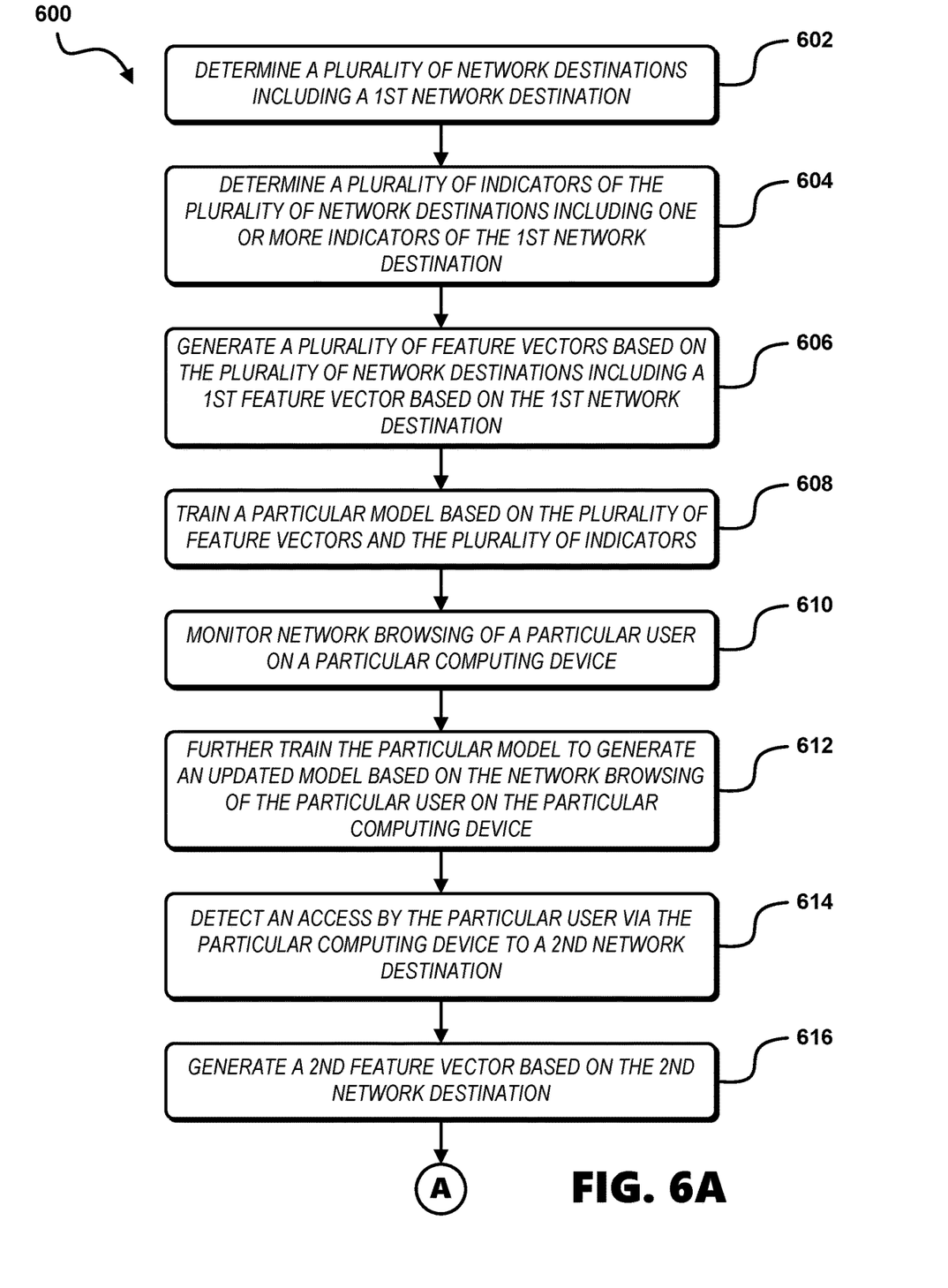
FIGS. 6A and 6B are diagrams showing a method of performing a notification action or blocking action with respect to access to a network destination.
Figure 6B:
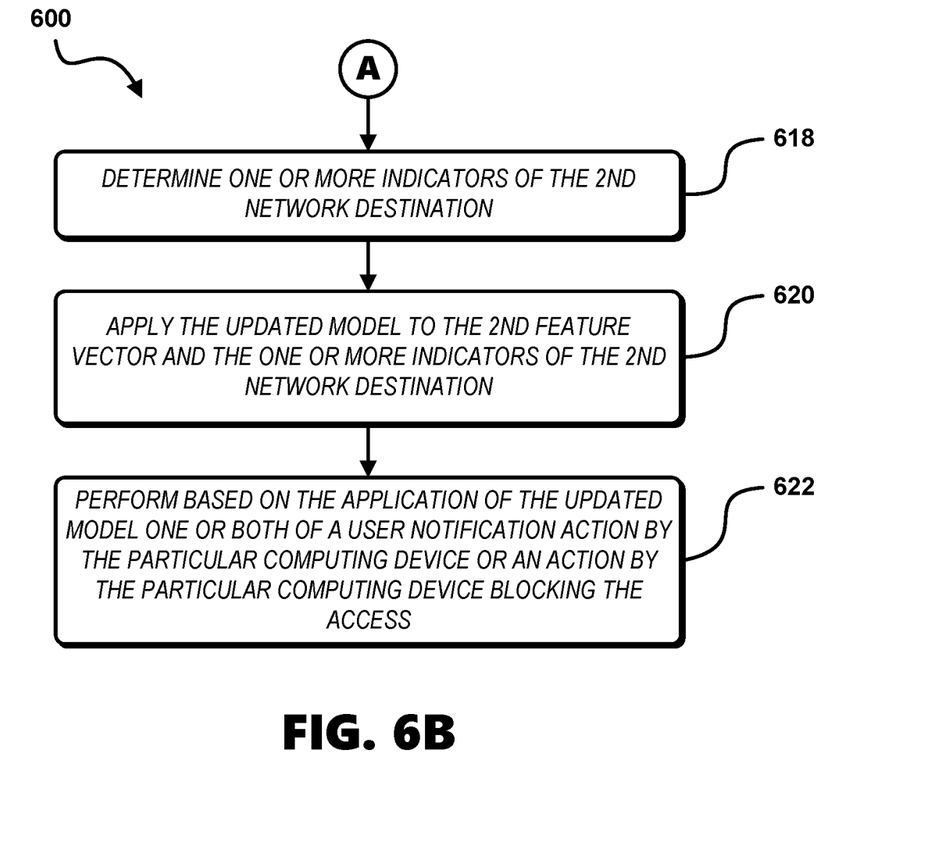

Referring to FIGS. 6A and 6B, a method 600 of performing a notification action or blocking action with respect to access to a network destination, for example a network destination on the internet, is shown. The method 600 is described with reference to the components of the environment 10, including the protection manager 20, the web servers 40, and the computing devices 12 including the browser 50 and the browser agent 60. Alternatively, the method 600 can be performed via other systems and is not restricted to being implemented by the described components.

Referring to FIG. 6A, the method 600 includes determining a plurality of network destinations including a first network destination (step 602) and determining a plurality of indicators of the plurality of network destinations including one or more indicators of the first network destination (step 604). A plurality of feature vectors are generated based on the plurality of network destinations including a first feature vector based on the first network destination (step 606). A particular model is trained based on the plurality of feature vectors and the plurality of indicators (step 608). Network browsing of a particular user on a particular computing device is monitored (step 610). The particular model is further trained to generate an updated model based on the network browsing of the particular user on the particular computing device (step 612). An access by the particular user via the particular computing device to a second network destination is detected (step 614). A second feature vector is generated based on the second network destination (step 616).

Referring to FIG. 6B and continuing from notation "A" of FIG. 6A, one or more indicators of the second network destination are determined (step 618). The updated model is applied to the second feature vector and the one or more indicators of the second network destination (step 620). The method 600 further includes performing based on the application of the updated model one or both of a user notification action by the particular computing device or an action by the particular computing device blocking the access by the particular user via the particular computing device to the second network destination (step 622).

Figure 7:
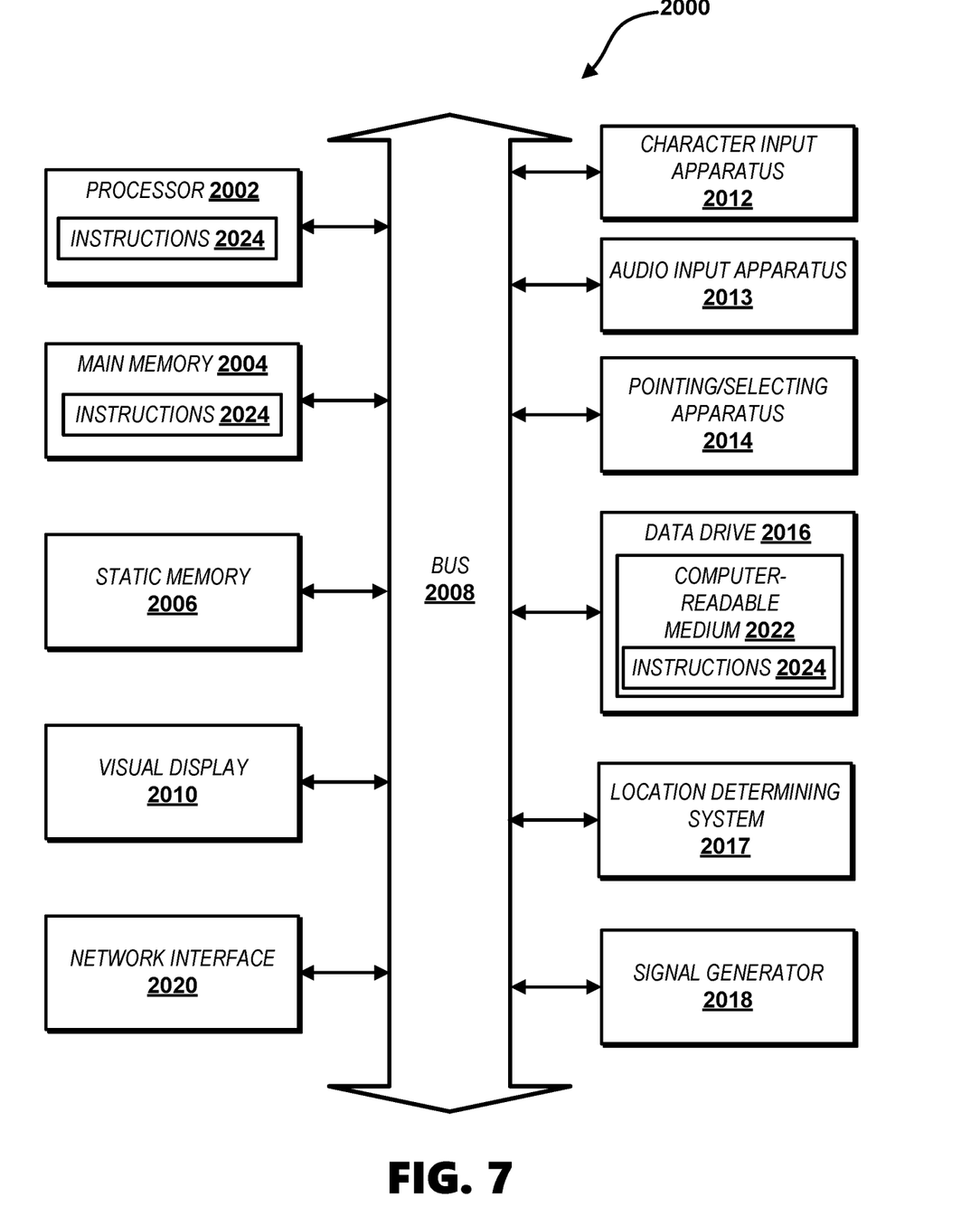
FIG. 7 shows a computer system for performing described methods according to illustrative embodiments.

FIG. 7 illustrates in abstract the function of an exemplary computer system 2000 on which the systems, methods and processes described herein can execute. For example, the computing device 12 and the protection manager 20 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   determining a plurality of network destinations comprising a first network destination, the plurality of network destinations comprising a plurality of webpages and the first network destination comprising a first webpage;
   determining a plurality of indicators of the plurality of network destinations comprising at least one indicator of the first network destination, the plurality of indicators comprising a plurality of Uniform Resource Locators ("URLs") of the plurality of webpages and a plurality of certificates of the plurality of webpages, and the at least one indicator of the first network destination comprising a Uniform Resource Locator ("URL") of the first webpage and a certificate of the first webpage;
   capturing a plurality of images of the plurality of webpages, comprising capturing a first image of the first webpage;
   generating a plurality of feature vectors based on the plurality of images comprising a first feature vector based on the first image;
   training a particular model based on the plurality of feature vectors and the plurality of indicators;
   monitoring network browsing of a particular user on a particular computing device;
   further training the particular model to generate an updated model based on the network browsing of the particular user on the particular computing device;
   detecting an access by the particular user via the particular computing device to a second network destination, the second network destination comprising a second webpage;
   capturing a second image of the second webpage;
   generating a second feature vector based on the second image;
   determining at least one indicator of the second network destination, the at least one indicator of the second network destination comprising a URL of the second webpage and a certificate of the second webpage;
   applying the updated model to the second feature vector and the at least one indicator of the second network destination; and
   blocking the access by the particular user via the particular computing device to the second network destination based on the applying of the updated model.

2. The method of claim 1, further comprising determining the plurality of network destinations comprising the first network destination based on the network browsing of the particular user.

3. The method of claim 1, further comprising:
   determining a match between the second feature vector and the first feature vector based on a comparison of the second feature vector to the plurality of feature vectors comprising the first feature vector; and
   blocking the access by the particular user via the particular computing device to the second network destination further based on the determination of the match.

4. The method of claim 1, further comprising:
   training a classifier based on the first feature vector and the at least one indicator of the first network destination;
   applying the classifier to the at least one indicator of the second network destination; and
   blocking the access by the particular user via the particular computing device to the second network destination based on the applying of the classifier.

5. The method of claim 1, wherein:
   the at least one indicator of the first network destination further comprises metadata of the first webpage; and the at least one indicator of the second network destination further comprises metadata of the second webpage.

6. The method of claim 1, further comprising:
monitoring network browsing of a plurality of users on a plurality of computing devices; and
determining the plurality of network destinations comprising the first network destination based on the network browsing of the plurality of users.

7. The method of claim 1, further comprising:
monitoring network browsing of a plurality of users on a plurality of computing devices;
and
determining the plurality of network destinations comprising the first network destination further based on the network browsing of the plurality of users.

8. The method of claim 1, further comprising inputting the plurality of feature vectors and the plurality of indicators to a convolutional neural network ("CNN") to train the particular model.

9. The method of claim 1, further comprising:
monitoring network browsing of a plurality of users on a plurality of computing devices;
determining the plurality of network destinations comprising the first network destination based on the network browsing of the plurality of users; and
transmitting the particular model to the particular computing device.

10. The method of claim 9, further comprising:
determining additional network destinations based on the network browsing of the particular user on the particular computing device;
determining additional indicators of the additional network destinations; and
generating additional feature vectors based on the additional network destinations; wherein the further training of the particular model to generate the updated model is based on the additional feature vectors and the additional indicators.

11. The method of claim 10, wherein the particular model comprises a particular convolutional neural network ("CNN"), the method further comprising:
inputting the plurality of feature vectors and the plurality of indicators to the particular CNN to train the particular model;
inputting the additional feature vectors and the additional indicators to the particular CNN to further train the particular model to generate the updated model, wherein the updated model comprises an updated CNN; and
inputting the second feature vector and the at least one indicator of the second network destination to the updated CNN to apply the updated model.

12. The method of claim 11, wherein the particular model further comprises a clustering algorithm, the method further comprising:
inputting an output resulting from the inputting of the plurality of feature vectors and the plurality of indicators to the particular CNN to the clustering algorithm to train the particular model;
inputting an output resulting from the inputting of the additional feature vectors and the additional indicators to the particular CNN to the clustering algorithm to further train the particular model to generate the updated model, the updated model comprising the clustering algorithm; and
inputting an output resulting from the inputting of the second feature vector and the at least one indicator of the second network destination to the updated CNN to the clustering algorithm to apply the updated model.

13. The method of claim 1,
the method further comprising:
determining a plurality of numbers of URL links respectively embedded in the plurality of webpages, wherein a first number of URL links embedded in the first webpage are determined;
determining a second number of URL links embedded in the second webpage;
generating the plurality of feature vectors comprising the first feature vector based on the plurality of numbers of URL links embedded, wherein the first feature vector is based on the first number of URL links embedded; and
generating the second feature vector based on the second number of URL links embedded.

14. The method of claim 1, wherein the applying of the updated model comprises comparing the second feature vector to the plurality of feature vectors comprising the first feature vector, and the comparing comprises determining a Euclidian distance between the second feature vector and the first feature vector.

15. The method of claim 1, further comprising providing a notification to the particular user based on the applying of the updated model.

16. The method of claim 1, further comprising:
determining additional network destinations based on the network browsing of the particular user on the particular computing device;
determining additional indicators of the additional network destinations, the additional indicators comprising additional URLs and additional certificates; and
generating additional feature vectors based on the additional network destinations; wherein the further training of the particular model to generate the updated model is based on the additional feature vectors and the additional indicators.

17. A method comprising:
determining a plurality of network destinations comprising a first network destination, the plurality of network destinations comprising a plurality of webpages and the first network destination comprising a first webpage;
determining a plurality of indicators of the plurality of network destinations comprising at least one indicator of the first network destination, the plurality of indicators comprising a plurality of Uniform Resource Locators ("URLs") of the plurality of webpages and a plurality of certificates of the plurality of webpages, and the at least one indicator of the first network destination comprising a Uniform Resource Locator ("URL") of the first webpage and a certificate of the first webpage;
capturing a plurality of images of the plurality of webpages, comprising capturing a first image of the first webpage;
generating a plurality of feature vectors based on the plurality of images comprising a first feature vector based on the first image;
training a particular model based on the plurality of feature vectors and the plurality of indicators;
monitoring network browsing of a particular user on a particular computing device;
further training the particular model to generate an updated model based on the network browsing of the particular user on the particular computing device;

detecting an access by the particular user via the particular computing device to a second network destination, the second network destination comprising a second webpage;
capturing a second image of the second webpage;
generating a second feature vector based on the second image;
determining at least one indicator of the second network destination, the at least one indicator of the second network destination comprising a URL of the second webpage and a certificate of the second webpage;
applying the updated model to the second feature vector and the at least one indicator of the second network destination; and
performing based on the applying of the updated model at least one of a user notification action by the particular computing device or an action by the particular computing device blocking the access by the particular user via the particular computing device to the second network destination.

18. A network threat mitigation system comprising:
a first computing system comprising at least a first processor and at least a first non-transitory computer readable storage medium having encoded thereon first instructions that when executed by the at least the first processor cause the first computing system to perform a first process including:
determining a plurality of network destinations comprising a first network destination, the plurality of network destinations comprising a plurality of webpages and the first network destination comprising a first webpage;
determining a plurality of indicators of the plurality of network destinations comprising at least one indicator of the first network destination, the plurality of indicators comprising a plurality of Uniform Resource Locators ("URLs") of the plurality of webpages and a plurality of certificates of the plurality of webpages, and the at least one indicator of the first network destination comprising a Uniform Resource Locator ("URL") of the first webpage and a certificate of the first webpage;
capturing a plurality of images of the plurality of webpages, comprising capturing a first image of the first webpage;
generating a plurality of feature vectors based on the plurality of images comprising a first feature vector based on the first image;
training a particular model based on the plurality of feature vectors and the plurality of indicators; and
transmitting the particular model;
a second computing system comprising at least a second processor and at least a second non-transitory computer readable storage medium having encoded thereon second instructions that when executed by the at least the second processor cause the second computing system to perform a second process including:
receiving the particular model from the first computing system;
monitoring network browsing of a particular user on the second computing system;
further training the particular model to generate an updated model based on the network browsing of the particular user on the second computing system;
detecting an access by the particular user via the second computing system to a second network destination, the second network destination comprising a second webpage;
generating a second feature vector based on the second network destination;
determining at least one indicator of the second network destination, the at least one indicator of the second network destination comprising a URL of the second webpage and a certificate of the second webpage;
applying the updated model to the second feature vector and the at least one indicator of the second network destination; and
performing based on the applying of the updated model at least one of a user notification action or an action blocking the access by the particular user via the second computing system to the second network destination.

19. The network threat mitigation system of claim 18, wherein the first process further includes:
monitoring network browsing of a plurality of users on a plurality of computing devices; and
determining the plurality of network destinations comprising the first network destination based on the network browsing of the plurality of users.

20. A computing system comprising at least one processor and at least one non-transitory computer readable storage medium having encoded thereon instructions that when executed by the at least one processor cause the computing system to perform a process including:
receiving a particular model based on a plurality of feature vectors and a plurality of indicators, the plurality of feature vectors and the plurality of indicators based on a plurality of network destinations comprising a first network destination and at least one indicator of the first network destination, the plurality of network destinations comprising a plurality of webpages, the first network destination comprising a first webpage, the plurality of indicators comprising a plurality of Uniform Resource Locators ("URLs") of the plurality of webpages and a plurality of certificates of the plurality of webpages, and the at least one indicator of the first network destination comprising a Uniform Resource Locator ("URL") of the first webpage and a certificate of the first webpage;
monitoring network browsing of a particular user on the computing system;
further training the particular model to generate an updated model based on the network browsing of the particular user on the computing system;
detecting an access by the particular user via the computing system to a second network destination, the second network destination comprising a second webpage;
capturing a second image of the second webpage;
generating a second feature vector based on the second image;
determining at least one indicator of the second network destination, the at least one indicator of the second network destination comprising a URL of the second webpage and a certificate of the second webpage;
applying the updated model to the second feature vector and the at least one indicator of the second network destination; and
performing based on the applying of the updated model at least one of a user notification action by the computing system or an action blocking the access by the particular user via the computing system to the second network destination.

21. A non-transitory computer-readable storage medium storing executable instructions that, as a result of execution by one or more processors of a particular computing device, cause the particular computing device to perform operations comprising:

receiving a particular model based on a plurality of feature vectors and a plurality of indicators, the plurality of feature vectors and the plurality of indicators based on a plurality of network destinations comprising a first network destination and at least one indicator of the first network destination, the plurality of network destinations comprising a plurality of webpages, the first network destination comprising a first webpage, the plurality of indicators comprising a plurality of Uniform Resource Locators ("URLs") of the plurality of webpages and a plurality of certificates of the plurality of webpages, and the at least one indicator of the first network destination comprising a Uniform Resource Locator ("URL") of the first webpage and a certificate of the first webpage;

monitoring network browsing of a particular user on the particular computing device;

further training the particular model to generate an updated model based on the network browsing of the particular user on the particular computing device;

detecting an access by the particular user via the particular computing device to a second network destination, the second network destination comprising a second webpage;

capturing a second image of the second webpage;

generating a second feature vector based on the second image;

determining at least one indicator of the second network destination;

applying the updated model to the second feature vector and the at least one indicator of the second network destination, the at least one indicator of the second network destination comprising a URL of the second webpage and a certificate of the second webpage; and performing based on the applying of the updated model at least one of a user notification action by the particular computing device or an action blocking the access by the particular user via the particular computing device to the second network destination.

\* \* \* \* \*